(12) United States Patent
Matsuzaki et al.

(10) Patent No.: US 11,886,513 B2
(45) Date of Patent: Jan. 30, 2024

(54) DATA ANALYSIS SYSTEM, DATA ANALYSIS METHOD, AND COMPUTER PROGRAM PRODUCT

(71) Applicant: Kabushiki Kaisha Toshiba, Minato-ku (JP)

(72) Inventors: Hidenori Matsuzaki, Fuchu (JP); Xinxiao Li, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 442 days.

(21) Appl. No.: 16/114,345

(22) Filed: Aug. 28, 2018

(65) Prior Publication Data

US 2019/0278871 A1    Sep. 12, 2019

(30) Foreign Application Priority Data

Mar. 7, 2018    (JP) .................................. 2018-041097

(51) Int. Cl.
*G06F 16/904*    (2019.01)
*G06F 16/901*    (2019.01)
*G06T 11/20*    (2006.01)
*G06F 40/18*    (2020.01)

(52) U.S. Cl.
CPC .......... *G06F 16/904* (2019.01); *G06F 16/901* (2019.01); *G06F 40/18* (2020.01); *G06T 11/206* (2013.01)

(58) Field of Classification Search
USPC ........................................................ 707/736
See application file for complete search history.

(56) References Cited

U.S. PATENT DOCUMENTS

| | | | | |
|---|---|---|---|---|
| 6,704,742 B1 * | 3/2004 | Huth | ................ | G06F 16/24539 707/802 |
| 6,925,389 B2 * | 8/2005 | Hitt | ........................ | G16H 10/40 435/7.1 |
| 8,103,966 B2 * | 1/2012 | Sabato | ................ | G06F 11/3476 715/810 |
| 8,902,777 B1 * | 12/2014 | Huang | .............. | H04W 28/0205 370/254 |

(Continued)

FOREIGN PATENT DOCUMENTS

| | | |
|---|---|---|
| JP | 2009-245128 A | 10/2009 |
| JP | 2018-5721 A | 1/2018 |

OTHER PUBLICATIONS

Jugel et al., M4: A Visualization-Oriented Time Series Data Aggregation, 2014 (Year: 2014).*

(Continued)

*Primary Examiner* — Yu Zhao
(74) *Attorney, Agent, or Firm* — Oblon, McClelland, Maier & Neustadt, L.L.P.

(57) ABSTRACT

A data analysis system includes a computer configured to set a selected column selected from a plurality of columns contained in a first data set and an attribute value range selected from a plurality of attribute values contained in the selected column; extract, from the first data set, a second data set corresponding to the selected column or to the selected column and the attribute value range; analyze the second data set; and display a data image provided by visualizing the second data set and an analysis result image provided by visualizing an analysis result of the second data set.

17 Claims, 17 Drawing Sheets

(56) References Cited

U.S. PATENT DOCUMENTS

| | | | | |
|---|---|---|---|---|
| 10,728,352 B2* | 7/2020 | Song | .................... | H04L 51/043 |
| 10,997,556 B2* | 5/2021 | Scott | .................... | G06Q 10/103 |
| 2011/0173264 A1* | 7/2011 | Kelly | .................. | G06F 16/9038 |
| | | | | 709/205 |
| 2012/0329537 A1* | 12/2012 | Gururajan | ............. | G07F 17/322 |
| | | | | 463/1 |
| 2015/0019537 A1* | 1/2015 | Neels | ...................... | G06F 16/26 |
| | | | | 707/722 |
| 2016/0092530 A1 | 3/2016 | Jakubiak et al. | | |
| 2016/0103902 A1* | 4/2016 | Moser | ................... | G06F 16/248 |
| | | | | 707/602 |
| 2016/0314545 A1* | 10/2016 | Jessen | .................... | G06Q 50/16 |
| 2017/0132277 A1* | 5/2017 | Hsiao | ..................... | G06Q 10/06 |
| 2022/0193981 A1* | 6/2022 | Saberton | .............. | B29C 64/106 |

OTHER PUBLICATIONS

Zj_oschina, Oschina, Solve the problem of too many HighStock points, NAN when displaying tooltip, 2013 (Year: 2013).*
Minitab Blog Editor, How to Create and Read an I-MR Control Chart, 2013 (Year: 2013).*
Byju, Weighted Average Formula, 2016 (Year: 2016).*
MIT, About Bubble Charts, Aug. 17, 2016 (Year: 2016).*
SSDS, Numeracy Skills, Feb. 4, 2010, University of Leicester (Year: 2010).*
Ghesmoune et al., "State-of-the-art on clustering data streams," 2016, (Year: 2016).*
Claudio J. Meneses, et al., "Visualization for Enhancing the Data Mining Process", Data Mining and Knowledge Discovery : Theory, Tools, and Technology III, Proceedings of SPIE, vol. 4384, 2001, 12 pages.

* cited by examiner

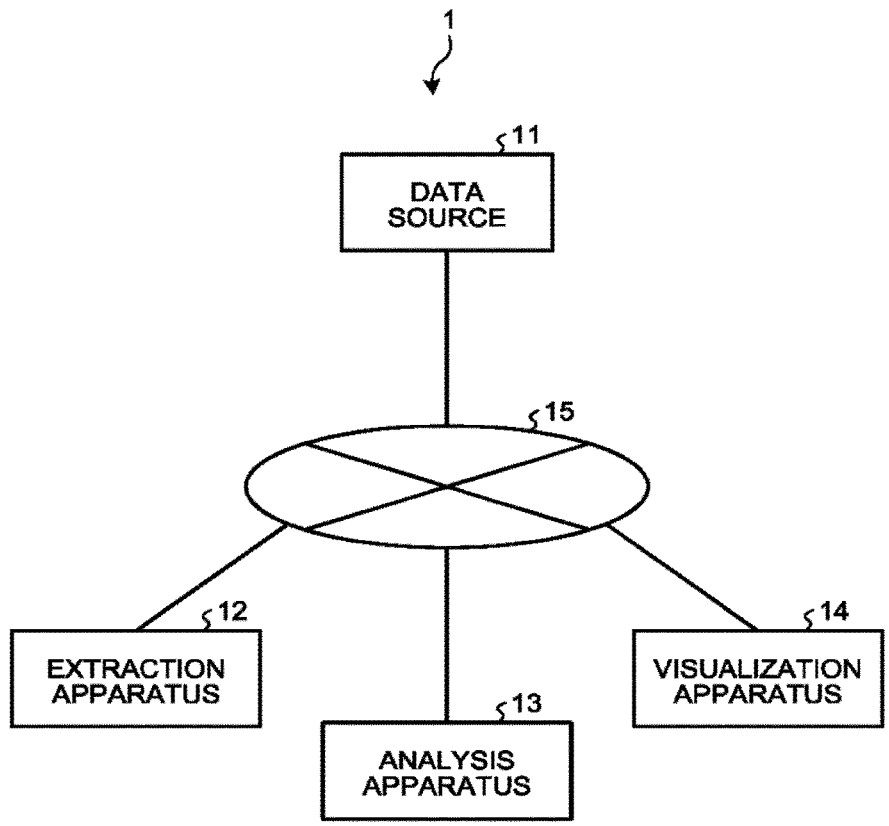
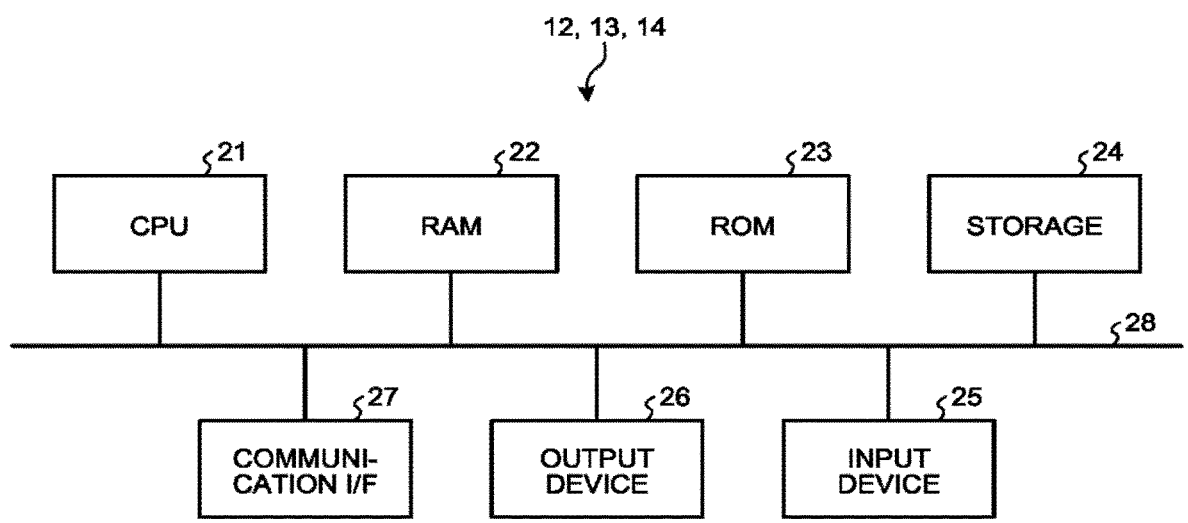

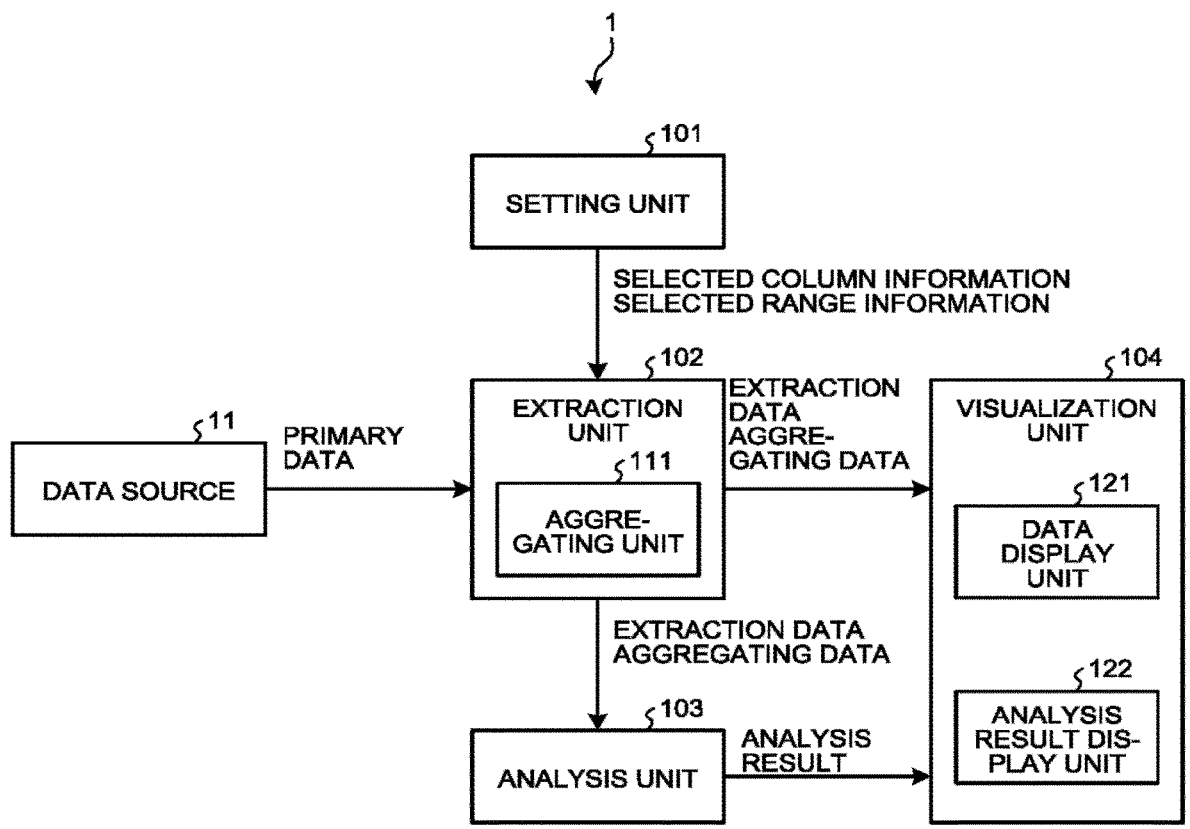

FIG.5

<SELECTED COLUMN INFORMATION> 35

| AXIS | SELECTED COLUMN |
|---|---|
| X AXIS | time |
| Y AXIS | FEATURE 2 |

FIG.6

<SELECTED RANGE INFORMATION> 36

| RANGE KEY | START POSITION | END POSITION |
|---|---|---|
| time | 10000 | 20000 |

FIG.7

<EXTRACTION DATA> 41

| time | FEATURE 2 |
|---|---|
| 1 | 65.1 |
| 2 | 67.4 |
| ⋮ | ⋮ |
| 999999 | 59.5 |
| 1000000 | 58.3 |

1000000 DATA

FIG.8

<EXTRACTION DATA> 42

| time | FEATURE 2 |
|---|---|
| 10000 | 66.1 |
| 10001 | 67.2 |
| ⋮ | ⋮ |
| 19999 | 70.2 |
| 20000 | 68.2 |

10001 DATA

FIG.9

<AGGREGATING DATA> 45

| time | FEATURE 2 (AVERAGE) |
|---|---|
| 10000 | 66.1 |
| 10100 | 69.8 |
| 10200 | 67.6 |
| 10300 | 70.4 |
| ⋮ | ⋮ |
| 20000 | 68.2 |

101 DATA

FIG.10

<ANALYSIS RESULT> 51

| ANOMALY SECTION ID | ANOMALY SECTION START POSITION | ANOMALY SECTION END POSITION |
|---|---|---|
| 1 | 15500 | 16000 |

<ANALYSIS RESULT>

| time | FEATURE 2 (AVERAGE) | NORMALITY/ANOMALY |
|---|---|---|
| 10000 | ⋮ | NORMAL |
| ⋮ | ⋮ | NORMAL |
| 15500 | ⋮ | ANOMALOUS |
| ⋮ | ⋮ | ANOMALOUS |
| 16000 | ⋮ | ANOMALOUS |
| ⋮ | ⋮ | NORMAL |

<PRIMARY DATA>

| time | FEATURE 1 | FEATURE 2 | FEATURE 3 |
|---|---|---|---|
| 1 | 30.0 | 65.1 | 360 |
| 2 | 30.1 | 67.4 | 362 |
| 8 | 30.5 | 69.2 | 364 |
| 24 | 30.1 | 69.5 | 366 |
| ⋮ | ⋮ | ⋮ | ⋮ |
| 1000000 | 28.2 | 58.3 | 356 |

FIG.29

<SELECTED RANGE INFORMATION> 235

| RANGE KEY | START POSITION | END POSITION |
|---|---|---|
| time | 16000 | 18000 |
| FEATURE 2 | 70 | 74 |

FIG.30

<ANALYSIS RESULT> 241

| CLUSTER ID | CLUSTER START POSITION | CLUSTER END POSITION |
|---|---|---|
| 1 | 10000 | 10300 |
| 2 | 10400 | 15000 |
| 3 | 15100 | 15900 |
| 4 | 16000 | 18000 |
| 5 | 18100 | 20000 |

<ANALYSIS RESULT>    245

| time | FEATURE 2 (AVERAGE) | DATA NUMBER | CLUSTER ID |
|---|---|---|---|
| 10000 | 66.1 | 1 | 1 |
| 10100 | 67.2 | 20 | 1 |
| 10200 | 67.6 | 1 | 1 |
| 10300 | 0 | 0 | 1 |
| 10400 | 68.4 | 2 | 2 |
| ⋮ | ⋮ | ⋮ | ⋮ |
| 20000 | 68.2 | 2 | 5 |

DATA ANALYSIS SYSTEM, DATA ANALYSIS METHOD, AND COMPUTER PROGRAM PRODUCT

CROSS-REFERENCE TO RELATED APPLICATIONS

This application is based upon and claims the benefit of priority from Japanese Patent Application No. 2018-041097, filed on Mar. 7, 2018; the entire contents of which are incorporated herein by reference.

FIELD

Embodiments described herein relate generally to a data analysis system, a data analysis method, and a computer program product.

BACKGROUND

In various fields, systems that analyze pieces of collected data and visualize the pieces of data, an analysis result, and the like have been used. For example, a system that displays a first visible image and a second visible image on the basis of a certain database and highlight-displays, on the second visible image, data corresponding to data selected on the first visible image has been disclosed. US Patent Application Publication No. 2016/0092530 is an example of conventional techniques.

In the above-mentioned system, when the database is large in scale, in particular, extraction processing of selecting and extracting a piece of data to be analyzed from the database is needed. In recent years, databases have been increased in scale with development of techniques related to Internet of Things (IoT) and big data. Advanced resources and algorithms (artificial intelligence and the like) are used for analysis processing in increased cases and importance of the extraction processing is increased in order to appropriately and efficiently perform the analysis processing.

Accurate extraction of the pieces of data appropriate for the analysis processing from the database requires specialized knowledge and experiences in some cases. A specific person in charge therefore performs the extraction processing as a separate operation from the analysis processing in many cases. Such a situation can cause lowering of workability in the system that analyzes the large-scale database.

In the extraction processing, a visible image provided by visualizing the pieces of data in the database is effective. The visible image enables characteristics of the pieces of data to be visually represented, thereby serving as an effective material in the extraction processing. Some conventional techniques, however, have the problem that the workability is low because data visualization processing, data extraction processing, and data analysis processing are not linked with one another.

BRIEF DESCRIPTION OF THE DRAWINGS

FIG. 1 is a diagram illustrating an example of the system configuration of a data analysis system according to a first embodiment;

FIG. 2 is a diagram illustrating an example of the hardware configuration of an extraction apparatus, an analysis apparatus, and a visualization apparatus in the first embodiment;

FIG. 3 is a block diagram illustrating an example f the functional configuration of the data analysis system in the first embodiment;

FIG. 4 is a diagram illustrating an example of the data structure of primary data in the first embodiment;

FIG. 5 is a diagram illustrating an example of the data structure of selected column information in the first embodiment;

FIG. 6 is a diagram illustrating an example of the data structure of selected range information in the first embodiment;

FIG. 7 is a diagram illustrating an example of the data structure of extraction data in a first example of the first embodiment;

FIG. 8 is a diagram illustrating an example of the data structure of extraction data in a second example of the first embodiment;

FIG. 9 is a diagram illustrating an example of the data structure of aggregating data in the first embodiment;

FIG. 10 is a diagram illustrating an example of the data structure of an analysis result in a first example of the first embodiment;

FIG. 29 is a diagram illustrating an example of the data structure of selected range information in the second embodiment;

FIG. 30 is a diagram illustrating an example of the data structure of an analysis result in a third example of the second embodiment;

DETAILED DESCRIPTION

First Embodiment

Figures 11, 12:
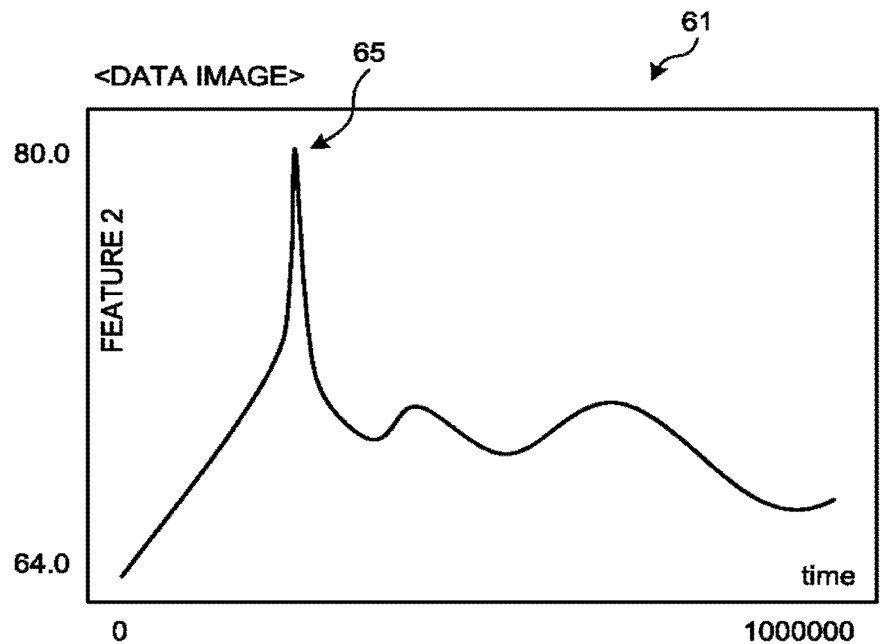
FIG. 11 is a diagram illustrating an example of the data structure of an analysis result in a second example of the first embodiment.
FIG. 12 is a diagram illustrating an example of a data image in a first example of the first embodiment.

FIG. 1 is a diagram illustrating an example of the system configuration of a data analysis system 1 according to a first embodiment. The data analysis system 1 is a system that analyzes pieces of collected data and presents an analysis result and the like to a user, and includes a data source 11, an extraction apparatus 12, an analysis apparatus 13, a visualization apparatus 14, and a network 15.

The data source 11 is an apparatus or a system (for example, a database server and an IoT system) that collects, accumulates, manages, and so on primary data (first data set) to be analyzed. The extraction apparatus 12 is an information processing apparatus that performs processing for extracting some pieces of data from the primary data accumulated in the data source 11. The analysis apparatus 13 is an information processing apparatus that performs processing for analyzing the pieces of data extracted by the extraction apparatus 12. The visualization apparatus 14 is an information processing apparatus that performs processing for visualizing the pieces of data extracted by the extraction apparatus 12, an analysis result by the analysis apparatus 13, and the like. The data source 11, the extraction apparatus 12, the analysis apparatus 13, and the visualization apparatus 14 are connected to one another via the network 15 such as the Internet and a local area network (LAN).

FIG. 2 is a diagram illustrating an example of the hardware configuration of the extraction apparatus 2, the analysis apparatus 13, and the visualization apparatus 14 in the first embodiment. Each of the extraction apparatus 12, the analysis apparatus 13, and the visualization apparatus 14 includes a central processing unit (CPU) 21, a random access memory (RAM) 22, a read only memory (ROM) 23, a storage 24, an input device 25, an output device 26, a communication interface (I/F) 27, and a bus 28. The CPU 21 performs predetermined control operation processing using the RAM 22 as a working area in accordance with a computer program stored in the ROM 23 or the like. The storage 24 is a data storage device that is implemented by a non-volatile memory, a magnetic disk, or the like and accumulates therein data necessary for processing in each of the apparatuses 12 to 14. The input device 25 is a device for inputting information from the outside and is, for example, a keyboard, a mouse, and a touch panel. The output device 26 is a device for outputting information generated internally to the outside and is, for example, a display, a speaker, and a printer. The communication I/F 27 is a device enabling transmission and reception of information to and from an external apparatus via an appropriate computer network (network 15 or the like). The input device 25 and/or the output device 26 are unnecessary in some cases.

The system configuration illustrated in FIG. 1 and the hardware configuration illustrated in FIG. 2 are merely examples and the data analysis system 1 should be constructed using appropriate hardware and software in accordance with usage conditions.

FIG. 3 is a block diagram illustrating an example of the functional configuration of the data analysis system 1 in the first embodiment. The data analysis system 1 includes a setting unit 101, an extraction unit 102, an analysis unit 103, and a visualization unit 104.

The setting unit 101 performs setting processing for extracting some pieces of data from the primary data. The setting unit 101 uses a graphic user interface or the like to receive a column selection operation of selecting a desired column from a plurality of columns contained in the primary data and a range selection operation of selecting a desired attribute value range from a plurality of attribute values contained in the selected column. The setting unit 101 generates selected column information indicating the column (selected column) selected by the column selection operation and selected range information indicating the attribute value range (selected range) selected by the range selection operation.

FIG. 4 is a diagram illustrating an example of the data structure of primary data 31 in the first embodiment. The primary data 31 in this example contains four columns of "time", "feature 1", "feature 2", and "feature 3", and a plurality of records 32 in which attribute values for the respective columns are related to one another are sorted in the ascending order on the basis of attribute values (1 to 1000000) for the "time". The attribute values for the "time" in the embodiment are continuous values that are increased uniformly over the entire range and indicate passage of time, for example. The data structure of the primary data 31 is not limited thereto and various data structures are allowed as long as the data structure contains a plurality of columns.

FIG. 5 is a diagram illustrating an example of the data structure of selected column information 35 in the first embodiment. The selected column information 35 in the embodiment has the structure in which an "axis" configuring a data image (data image 61, 62, or the like illustrated in FIG. 12, 13, or the like, which will be described later) as an image provided by visualizing some pieces of the primary data 31 and a "selected column" indicating the selected column selected by the above-mentioned column selection operation are related to each other. In this example, the selected column information 35 is set such that the attribute values for the "time" are arranged on an "X axis" of the data image and the attribute values for the "feature 2" are arranged on a "Y axis" thereof. The data structure of the selected column information 35 is not limited thereto and is appropriately determined in accordance with the data structure of the primary data 31, the configuration of the data image, and the like. When the data image is, for example, a three-dimensional image, selected column information having the data structure in which the selected column is related to each of the X axis, the Y axis, and the Z axis is generated.

FIG. 6 is a diagram illustrating an example of the data structure of selected range information 36 in the first embodiment. The selected range information 36 in this example has the structure in which a "range key" ("time" in this example) indicating a specific selected column, a "start position" ("10000" in this example) selected from the entire attribute value range for the selected column, and an "end position" ("20000" in this example) selected from the entire attribute value range for the selected column are related to one another. A range from the start position to the end position ("10000 to 20000" in this example) is a selected range selected by the above-mentioned range selection operation. The data structure of the selected range information 36 is not limited thereto and can be appropriately determined in accordance with the data structure of the primary data 31, the configuration of the data image, and the like. When the data image is, for example, a three-dimensional image, the attribute value range (the start position to the end position) may be set to each of equal to or more than two axes selected from the X axis, the Y axis, and the Z axis.

The extraction unit 102 extracts extraction data (second data set) corresponding to the selected columns and the selected range from the primary data 31 on the basis of the selected column information 35 and the selected range information 36. The extraction unit 102 may extract pieces of data in the entire attribute value range for the selected columns on the basis of only the selected column information or may extract only pieces of data corresponding to the selected range of the entire attribute value range for the selected columns on the basis of both of the selected column information 35 and the selected range information 36.

FIG. 7 is a diagram illustrating an example of the data structure of extraction data 41 in a first example of the first embodiment. The extraction data 41 in this example is an example when the pieces of data in the entire attribute value range (1 to 1000000) for the selected columns ("time" and "feature 2") are extracted on the basis of only the selected column information 35. The data amount (the number of records) of the extraction data 41 in this example is 1000000.

FIG. 8 is a diagram illustrating an example of the data structure of extraction data 42 in a second example of the first embodiment. The extraction data 42 in this example is an example when only the pieces of data corresponding to the selected range (10000 to 20000) of the entire attribute value range for the selected columns ("time" and "feature 2") are extracted on the basis of both of the selected column information 35 and the selected range information 36. The data amount of the extraction data 42 in this example is 10001.

The extraction unit 102 in the embodiment includes a aggregating unit 111. The aggregating unit 111 performs aggregating processing of aggregating the extraction data 41 or 42 on the basis of predetermined parameters to generate aggregating data (third data set) having a reduced data amount relative to the extraction data 41 or 42. A specific method of the aggregating processing is not particularly limited and is to be appropriately determined in accordance with a aggregating object, the data structure of the extraction data 41 or 42, and the like. The aggregating processing can be performed by a method in which the data amount of the extraction data 41 or 42 is reduced using average values, maximum values, minimum values, or the like of the attribute values for the selected columns, for example. The aggregating object can be an object so as to follow restrictions on a resource, for example. The restrictions on the resource can be, for example, limits of a resolution of a display (display device), processing ability of the CPU, a storage capacity of a memory, and the like. The predetermined parameters can be, for example, a value based on the resolution of the display, a value based on the processing ability of the CPU, a value based on the storage capacity of the memory, and setting values by the user.

The aggregating processing is not necessarily required to be executed and may be executed only when a predetermined condition is satisfied. The aggregating processing may be performed, for example, when the data amount of the extraction data 41 or 42 is equal to or larger than a predetermined value, when there is the necessity to follow the restrictions on the resource, or when the aggregating processing is requested from the user.

FIG. 9 is a diagram illustrating an example of the data structure of aggregating data 45 in the first embodiment. The aggregating data 45 in this example is an example of data provided by performing the aggregating processing on the extraction data 42 illustrated in FIG. 8. The attribute value range for the "time" in the aggregating data 45 is segmented 100 by 100. Each attribute value for the "feature 2 (average)" in the aggregating data 45 is an average value of the attribute values for the "feature 2" in the extraction data 42. An attribute value "69.8" for the "feature 2 (average)" that corresponds to an attribute value "10100" for the "time" in the aggregating data 45 can be an average value of the attribute values for the "feature 2" that correspond to "10051 to 10150" for the "time" in the extraction data 42. The data amount of the aggregating data 45 is thereby 101 and is largely reduced from the data amount (10001) in the extraction data 42. The data structure of the aggregating data is not limited thereto and is to be appropriately determined in accordance with the method of the aggregating processing (for example, the method using the maximum value, the minimum value, or the like), the data structure of the extraction data 41 or 42, and the like.

The analysis unit 103 analyses the extraction data 41 or 42 extracted by the extraction unit 102 or the aggregating data 45 generated by the aggregating unit 111. Contents of analysis processing by the analysis unit 103 should not be particularly limited but can be, for example, anomaly detection, clustering processing, or tendency analysis. An analysis result by the analysis unit 103 is output to the visualization unit 104.

FIG. 10 is a diagram illustrating an example of the data structure of an analysis result 51 in a first example of the first embodiment. The analysis result 51 in this example is data indicating an analysis result of the analysis processing (anomaly detection in this example) on the extraction data 42 or the aggregating data 45. The analysis result 51 in this example has a structure in which an anomaly section ID specifying a section with anomaly detected (attribute value range containing a time point at which the anomaly has occurred), an anomaly section start position indicating a start position of the section with the anomaly detected, and an anomaly section end position indicating an end position of the section with the anomaly detected are related to one another. The analysis result. 51 can specify the attribute value range (15500 to 16000 in this example) in which the anomaly has occurred for a certain column ("time" in this example).

FIG. 11 is a diagram illustrating an example of the data structure of an analysis result 52 in a second example of the first embodiment. The analysis result 52 in this example is data indicating an analysis result of the analysis processing on the extraction data 42 or the aggregating data 45 as in the analysis result 51 in the first example. The analysis result 52 in this example has a data structure indicating an analysis result of normality/anomaly for each of a plurality of sections into which the entire attribute value range for a certain column ("time" in this example) in the extraction data 42 or the aggregating data 45 is divided. The analysis result 52 enables determination of attribute value ranges in which the anomaly has occurred and attribute value ranges in which no anomaly has occurred in the entire attribute value range for e certain column.

The data structure of the analysis result is not limited to the above-mentioned data structure and is appropriately determined in accordance with the contents of the analysis processing, the data structure of the extraction data 41 or 42 or the aggregating data 45, and the like.

The visualization unit 104 visualizes the extraction data 41 or 42 generated by the extraction unit 102 or the aggregating data 45 generated by the aggregating unit 111, and the analysis result 51 or 52 output from the analysis unit 103. The visualization unit 104 includes a data display unit 121 and an analysis result display unit 122. The data display unit 121 displays a data image provided by visualizing the extraction data 41 or 42 or the aggregating data 45. The analysis result display unit 123 displays an analysis result image provided by visualizing the analysis result 51 or 52.

FIG. 12 is a diagram illustrating an example of the data image 61 in a first example of the first embodiment. The data image 61 in this example is an image provided by visualizing the extraction data 41 in the first example illustrated in FIG. 7. The entire attribute value range (1 to 1000000) for the selected column "time" corresponding to the X axis is a drawing target of the data image 61. The data image 61 contains a singular point 65 at which the attribute value for the "feature 2" is largely increased drastically.

Figure 13:
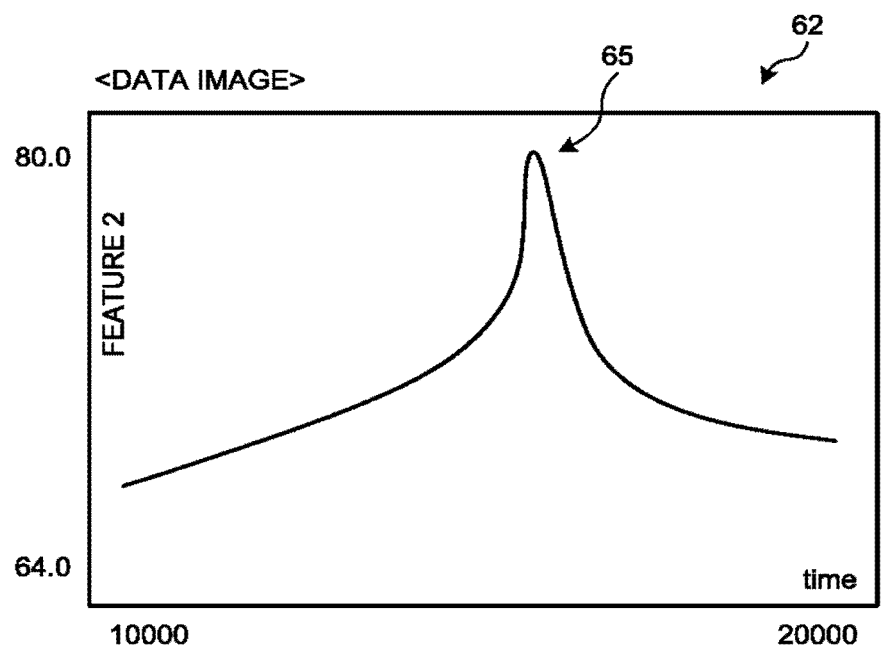
FIG. 13 is a diagram illustrating an example of a data image in a second example of the first embodiment.

FIG. 13 is a diagram illustrating an example of the data image 62 in a second example of the first embodiment. The data image 62 in this example is an image provided by visualizing the extraction data 42 in the second example illustrated in FIG. 8 or the aggregating data 45 illustrated in FIG. 9. The attribute value range (selected range of 10000 to 20000) selected from the entire attribute value range for the selected column "time" corresponding to the X column is a drawing target of the data image 62. The data image 62 contains the singular point 65. That is to say, the selected range of 10000 to 20000 is set so as to contain the singular point 65.

The screen structure of the data image is not limited to the above-mentioned structure and is appropriately determined in accordance with the data structure of the extraction data 41 or 42 or the aggregating data 45, and the like.

Figure 14:
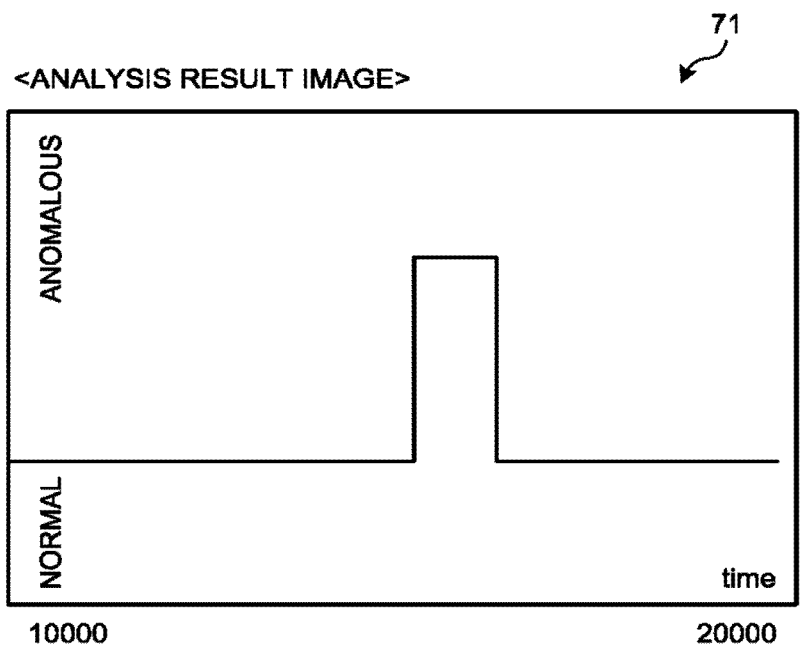
FIG. 14 is a diagram illustrating an example of an analysis result image in a first example of the first embodiment.

FIG. 14 is a diagram illustrating an example of an analysis result image 71 in a first example of the first, embodiment. The analysis result image 71 in this example is an image provided by visualizing the analysis result 51 in the first example illustrated in FIG. 10 or the analysis result 52 in the second example illustrated in FIG. 11. The analysis result image 71 is an ON/OFF graph indicating a portion determined to be anomalous with Hi (ON) and indicating a portion determined to be normal with Lo (OFF).

Figure 15:
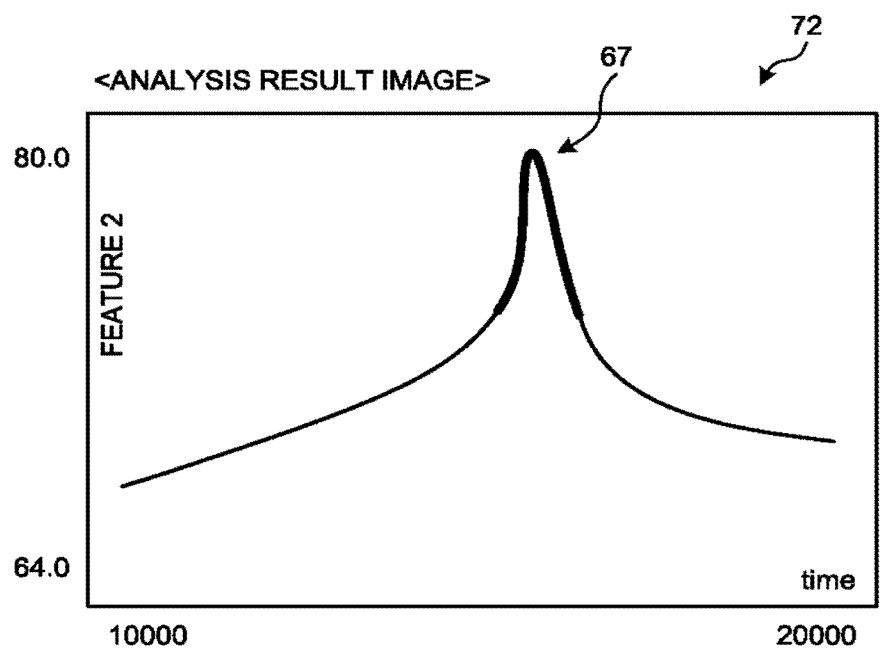
FIG. 15 is a diagram illustrating an example of an analysis result image in a second example of the first embodiment.

FIG. 15 is a diagram illustrating an example of an analysis result image 72 in a second example of the first embodiment. The analysis result image 72 in this example is an image provided by visualizing the analysis result 51 in the first example illustrated in FIG. 10 or the analysis result 52 in the second example illustrated in FIG. 11 as in the analysis result image 71 in the first example. The analysis result image 72 contains an anomalous portion object 67 indicating an anomalous portion displayed in a display format differing from a normal portion such that the anomalous portion can be visually checked on the data 62 illustrated in FIG. 13.

The data structure of the analysis result 71 or 72 is not limited to the above-mentioned structure and is appropriately determined in accordance with the contents of the analysis processing.

Each of the above-mentioned functional units 101 to 104 is implemented by using equal to or more than one integrated circuits. Each of the above-mentioned functional units 101 to 104 may be implemented by causing a processor such as the CPU 21 to execute a computer program, that is, by software. Each of the above-mentioned functional units 101 to 104 may be implemented by an exclusive processor such as an integrated circuit (IC), that is, hardware. Each of the above-mentioned functional units 101 to 104 may be implemented by software and hardware in combination. When a plurality of processors are used, each of the processors may implement one of the above-mentioned functional units 101 to 104 or implement equal to or more than two of the above-mentioned functional units 101 to 104.

The computer program for implementing the functions of the above-mentioned data analysis system 1 can be recorded and provided in a computer-readable recording medium such as a compact disc (CD)-ROM, a flexible disk (FD), a compact disc recordable (CD-R), and a digital versatile disc (DVD), as an installable or executable file. The computer program may be provided by being downloaded onto a predetermined computer from a predetermined storage device connected to the network or may be embedded in a ROM in advance, for example, an, provided to a predetermined information processing apparatus. The computer program may be configured by a plurality of modules implementing the functions of the above-mentioned functional units 101 to 104.

Figure 16:
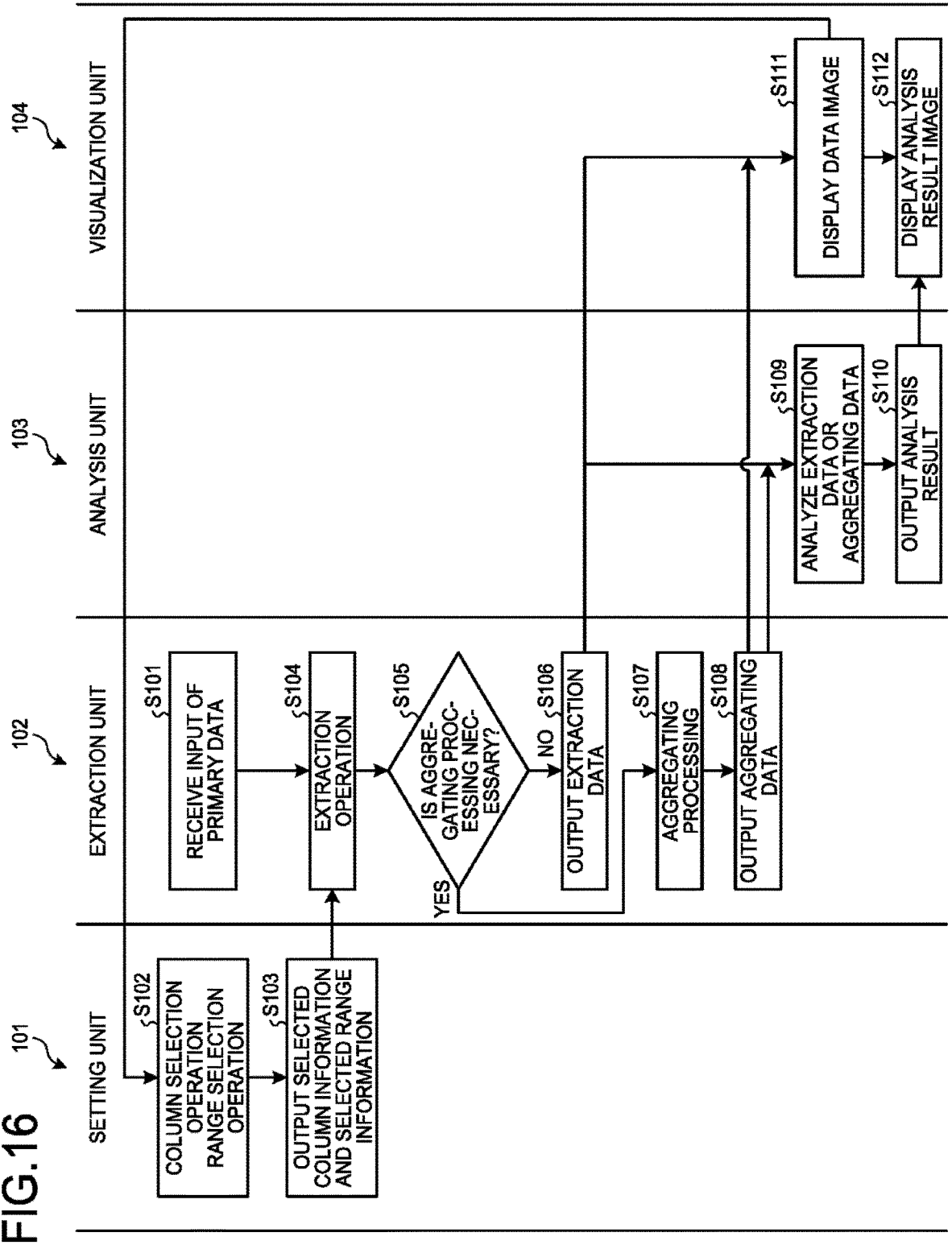
FIG. 16 is a sequence diagram illustrating an example of processing in the data analysis system in the first embodiment.

FIG. 16 is a sequence diagram illustrating an example of processing in the data analysis system 1 in the first embodiment. When the extraction unit 102 receives input of the primary data 31 from the data source 11 (S101), the setting unit 101 receives the column selection operation and the range selection operation by the user 102) and outputs, to the extraction unit 102, the selected column information 35 indicating the selected column selected by the column selection operation and the selected range information 36 indicating the selected range selected by the range selection operation (S103).

Figure 17:
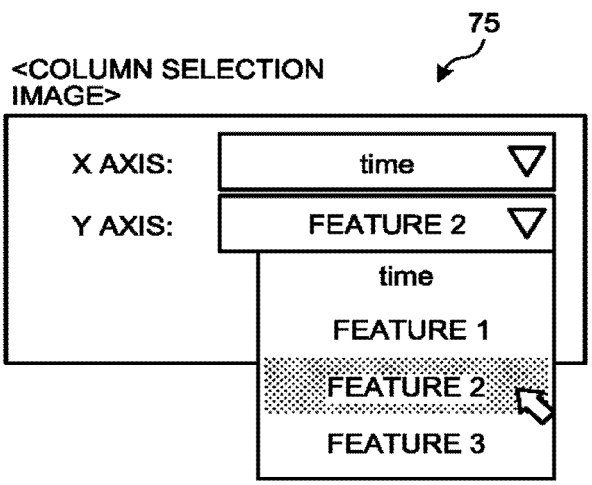
FIG. 17 is a diagram illustrating an example of a column selection image in the first embodiment.

FIG. 17 is a diagram illustrating an example of a column selection image 75 in the first embodiment. The column selection image 75 is an example of a graphic user interface that is used when the column selection operation at step S102 is performed. The column selection image 75 in this example contains an input portion for selecting the selected column ("time" in this example) corresponding to the X axis of the data image 61 or 62 and an input portion for selecting the selected column ("feature 2" in this example) corresponding to the Y axis thereof.

Figure 18:
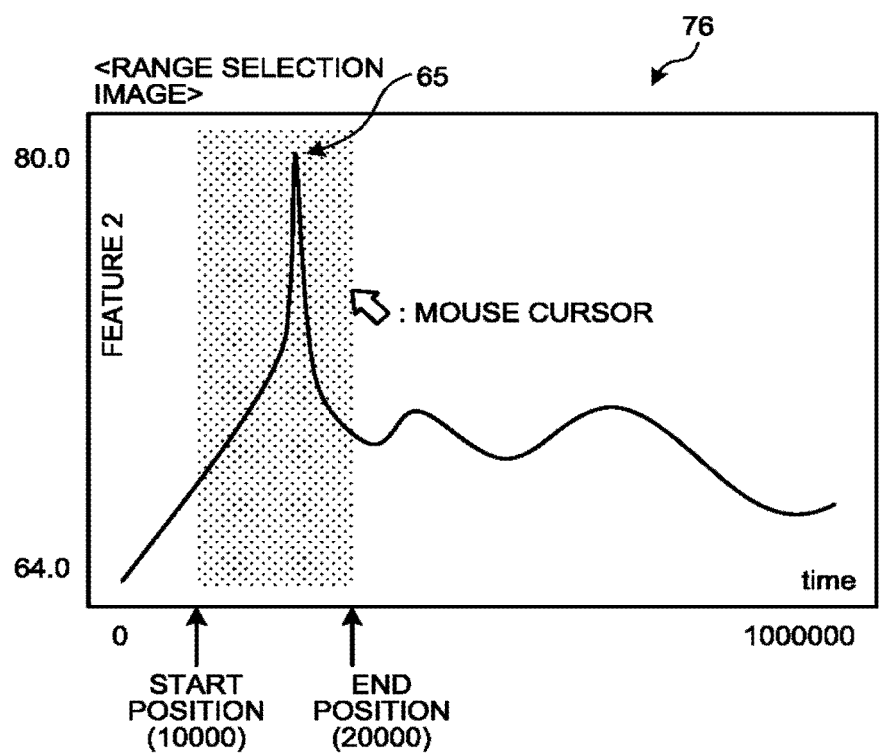
FIG. 18 is a diagram illustrating an example of a range selection image in the first embodiment.

FIG. 18 is a diagram illustrating an example of a range selection image 76 in the first embodiment. The range selection image 76 is an example of a graphic user interface that is used when the range selection operation at step S102 is performed. The range selection image 76 in this example is configured so as to enable setting of a desired selected range (a "start position of 10000" and an "end position of 20000" in this example) from the entire attribute value range of the X axis using drag and drop operations of the mouse on the data image 61 illustrated in FIG. 12. For example, the start position is instructed to be specified by the drag operation and the end position is instructed to be specified by the drop operation. The user can easily set the selected range so as to contain the singular point 65 while checking the screen by using the above-mentioned range selection image 76.

With reference to FIG. 16 again, the extraction unit 102 performs the extraction operation of extracting the extraction data 41 or 42 corresponding to the selected columns or the selected columns and the selected range from the primary data 31 on the basis of the selected column information 35 or tree selected column information 35 and the selected range information 36 (S104) and determines whether the aggregating processing on the extraction data 41 or 42 is necessary (S105). A method for determining whether the aggregating processing is necessary should not be particularly limited but the aggregating process can be determined to be necessary, for example, when the data amount of the extraction data 41 or 42 is equal to or larger than the predetermined value, when there is the necessity to follow the restrictions on the resource, or when the aggregating processing is requested from the user.

When the aggregating processing is not necessary (No at S105), the extraction unit 102 outputs the extraction data 41 or 42 as it is to the analysis unit 103 and the visualization unit 104 (S106). When the aggregating processing is necessary (Yes at 2105), the extraction unit 102 (aggregating unit 111) executes the aggregating processing on the extraction data 41 or 42 (S107) and outputs the aggregating data 45 generated by the aggregating processing to the analysis unit 103 and the visualization unit 104 (S108).

The analysis unit 103 analyzes the extraction data 41 or 42 or the aggregating data 45 output from the extraction unit 102 (S109) and outputs an analysis result to the visualization unit 104 (S110).

The visualization unit 104 displays the data image 61 or 62 provided by visualizing the the extraction data 41 or 42 or the aggregating data 45 output from the extraction unit 102 (S111), and displays the analysis result image 71 or 72 indicating the analysis result output from the analysis unit 103 (S112). It is preferable that the data image 61 or 62 and the analysis result image 71 or 72 be able to be displayed on the same screen.

The user can perform the column selection operation or the range selection operation by the setting unit 101 at step S102 and appropriately change the selected columns or the selected range while checking the data image 61 or 62 displayed by the visualization unit 104 at step S111. The extraction unit 102 updates the extraction data 41 or 42 or the aggregating data 45, the analysis unit 103 updates the analysis result, and the visualization unit 104 updates the data image 61 or 62 and the analysis result image 71 or 72 in accordance with change of the selected columns or the selected range. The user can thereby easily select data to be analyzed while checking the data image 61 or 62 and the analysis result image 71 or 72.

As mentioned above, the data analysis system 1 in the embodiment can perform, on the primary data 31 containing the columns, the data visualization processing, the data extraction (including aggregating) processing, and the data analysis processing in a linked manner. Accordingly, workability in the system that analyzes the pieces of data extracted from the database can be largely improved.

Although another embodiment will be described below with reference to the accompanying drawings, the same reference numerals denote portions providing the same or similar action effects as or to those in the first embodiment and description thereof is omitted in some cases.

Second Embodiment

Figures 19, 20:
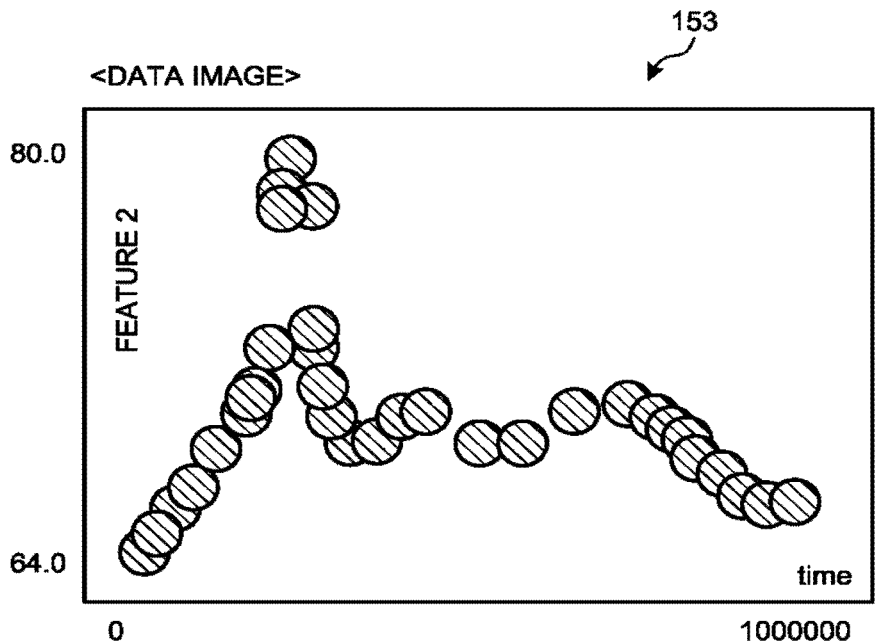
FIG. 19 is a diagram illustrating an example of the data structure of primary data according to a second embodiment.
FIG. 20 is a diagram illustrating an example of a data image in the second embodiment.

FIG. 19 is a diagram illustrating an example of the data structure of primary data 151 according to a second embodiment. Although the attribute values for the column "time" are values of 1 to 1000000 with equal intervals in the primary data 31 in the first embodiment, attribute values for a column "time" are values of 1 to 1000000 with unequal intervals in the primary data 151 in embodiment. That is to say, the primary data 151 in the embodiment is configured only by columns ("time", "feature 1", "feature 2", and "feature 3") for which a plurality of attribute values are not aligned with equal intervals.

FIG. 20 is a diagram illustrating an example of a data image 153 in the second embodiment. The data image 153 is an image provided by visualizing extraction data extracted from the primary data 151 illustrated in FIG. 19 on the basis of the selected column information 35 illustrated in FIG. 5 and is a scatter diagram corresponding to the unequal intervals of the attribute values for the selected column "time". It should be noted that a display format of a bar chart, a line chart, or the like may be employed.

Figure 21:
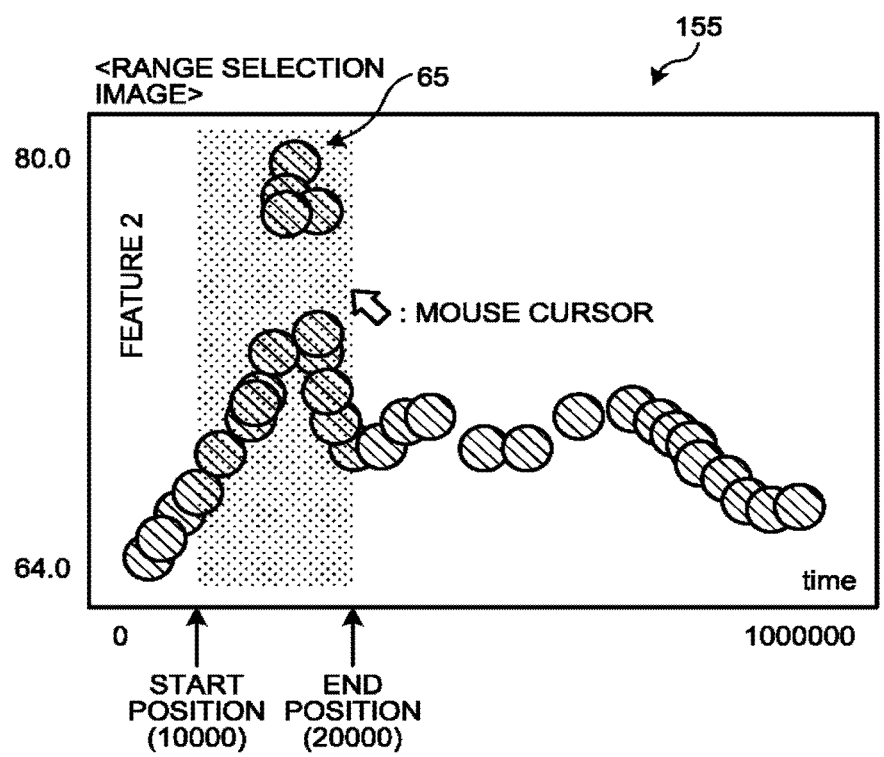
FIG. 21 is a diagram illustrating an example of a range selection image in a first example of the second embodiment.

FIG. 21 is a diagram illustrating an example of a range selection image 155 in a first example of the second embodiment. The range selection image 155 is an example of a graphic user interface that is used when a range selection operation is performed as in the range selection image 76 in the first embodiment illustrated in FIG. 18. The range selection image 155 is configured so as to enable setting of a desired selected range "start position of 10000" and an "end position of 20000" in this example) from the non-continuous attribute value range for the "time" on the X axis using a mouse cursor on the data image 153 illustrated in FIG. 0.

Figure 22:
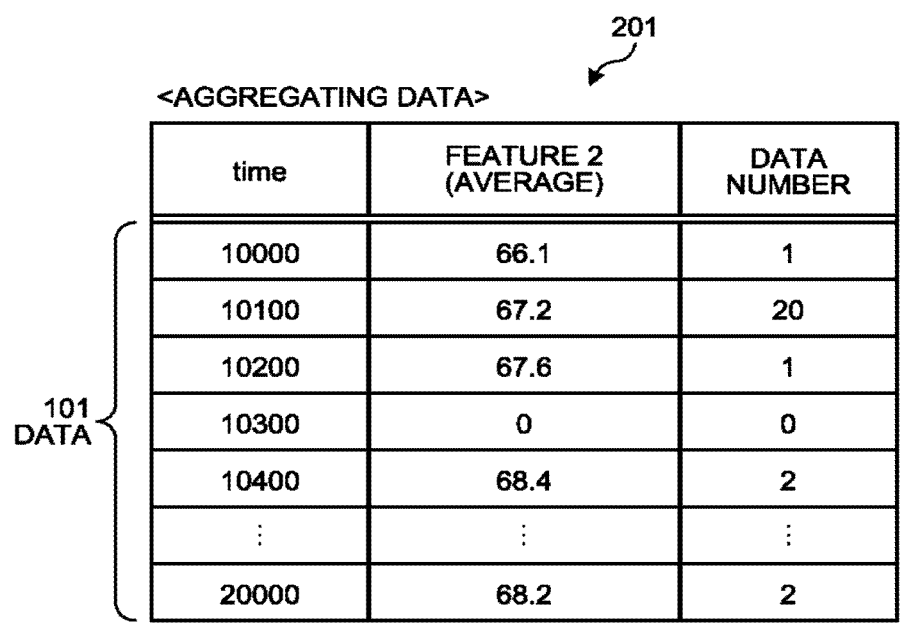
FIG. 22 is a diagram illustrating an example of the data structure of aggregating data in the second embodiment.

FIG. 22 is a diagram illustrating an example of the data structure of aggregating data 201 in the second embodiment. The aggregating unit 111 (see FIG. 3) in the embodiment counts the number of pieces of data used for calculating values (for example, average values) aggregated by aggregating processing to generate the aggregating data 201 containing "data number" indicating the number of pieces of data. For example, when a value (for example, 67.2) for the "feature 2 (average)" is an average value of 20 attribute values, the "data number" corresponding thereto is "20". The data number is not limited thereto and may be the number of attribute values used for determining a maximum value or minimum value, for example.

Figure 23:
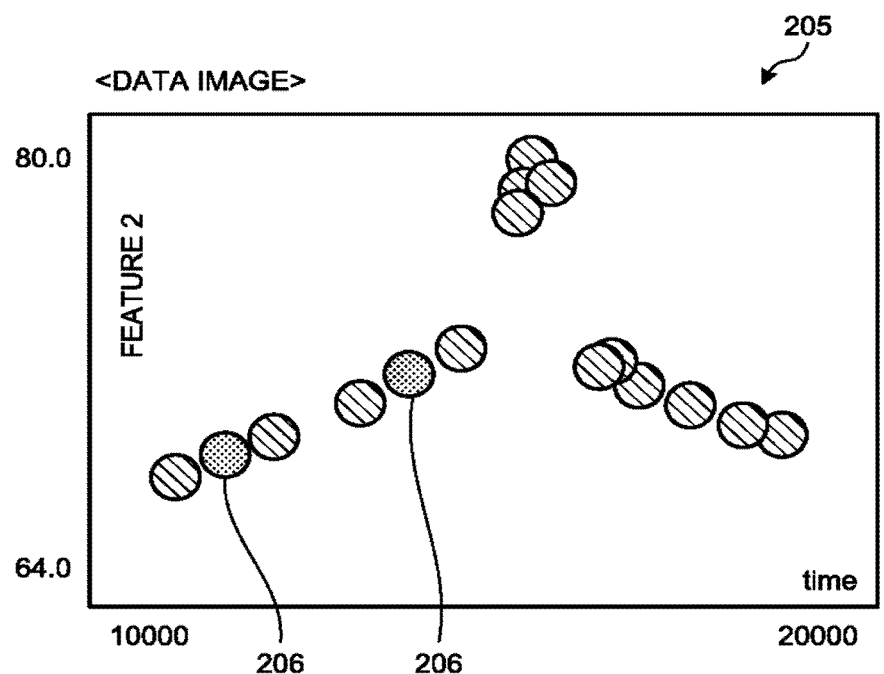
FIG. 23 is a diagram illustrating an example of a data image in the second embodiment.

FIG. 23 is a diagram illustrating an example of a data image 205 in the second embodiment. The data image 205 in this example is an image provided by visualizing the aggregating data 201 illustrated in FIG. 22 and contains singular objects 206 with a display format (for example, color, flashing, brightness, or shape) differing from that of other portions. The singular objects 206 indicate points at which values for the "data number" in the aggregating data 201 satisfy a predetermined condition and indicate points at which the values for the "data number" are equal to or larger than 10 in this example. It can be considered that as the value for the "data number" is larger, reliability of the value for the "feature 2 (average)" is increased. Accordingly, portions with high reliability in the data image 205 can be visually represented by displaying the above-mentioned singular objects 206. The condition under which the singular objects 206 are displayed is not limited to the above-mentioned condition and may be the condition that the value for the "data number" is equal to or smaller than a predetermined value, for example.

Figure 24:
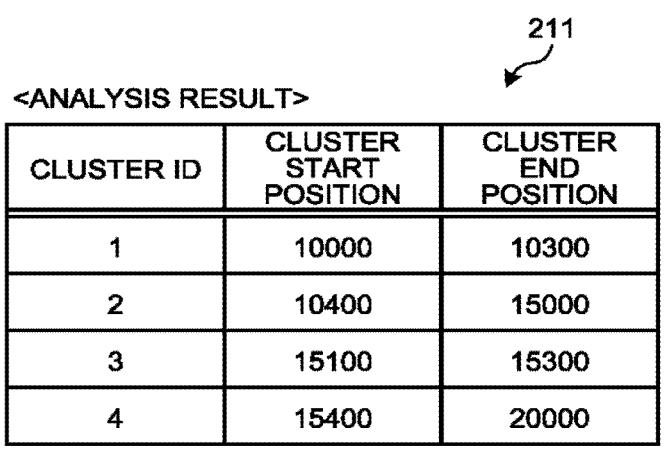
FIG. 24 is a diagram illustrating an example of the data structure of an analysis result in a first example of the second embodiment.

FIG. 24 is a diagram illustrating an example of the data structure of an analysis result 211 in a first example of the second embodiment. The analysis unit 103 (see FIG. 3) in the embodiment performs clustering processing as the analysis processing on the extraction data or the aggregating data to generate the analysis result 211 indicating a result of the clustering processing. The analysis result 211 in this example indicates a result of the clustering processing performed on the aggregating data 201 illustrated in FIG. 22. A method for the clustering processing should not be particularly limited but, for example, a k-means method can be used. The above-mentioned clustering processing may be performed using the above-mentioned "data number" as a weight. The analysis result 211 in this example contains a "cluster ID" indicating an identifier specifying a cluster, a "cluster start position" indicating a start position of the cluster, and a "cluster end position" indicating an end position of the cluster. In this example, the aggregating data 201 is divided into four clusters.

Figure 25:
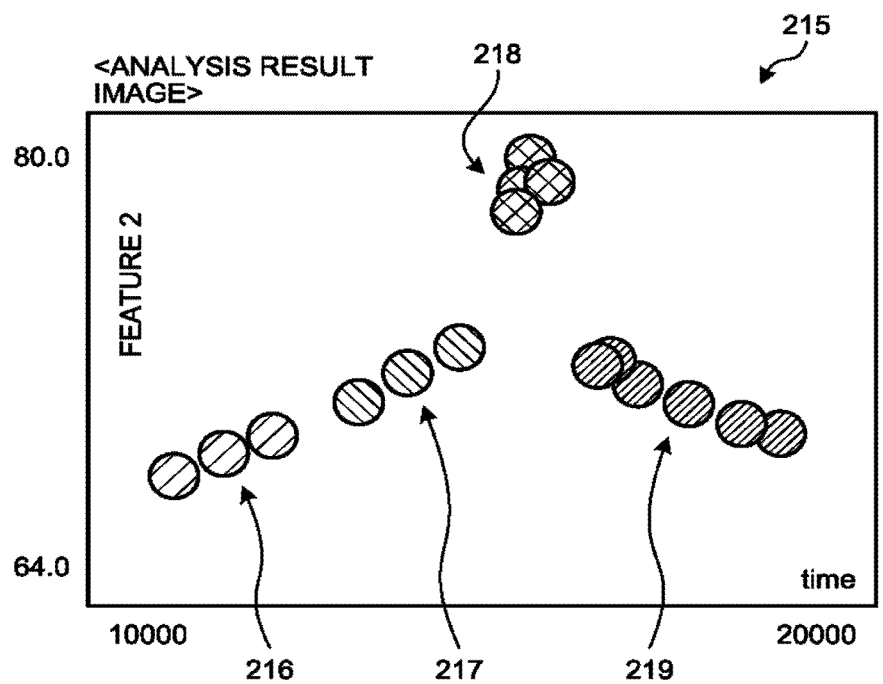
FIG. 25 is a diagram illustrating an example of an analysis result image in the first example of the second embodiment.

FIG. 25 is a diagram illustrating an example of an analysis result image 215 in the first example of the second embodiment. The analysis result image 215 in this example contains cluster objects 216 to 219 with different display formats for the respective clusters. In this example, a group of the first cluster object 216 corresponds to a cluster ID "1", a group of the second cluster object 217 corresponds to a cluster ID "2", a group of the third cluster object 218 corresponds to a cluster ID "3", and a group of the fourth cluster object 219 corresponds to a cluster ID "4".

Figure 26:
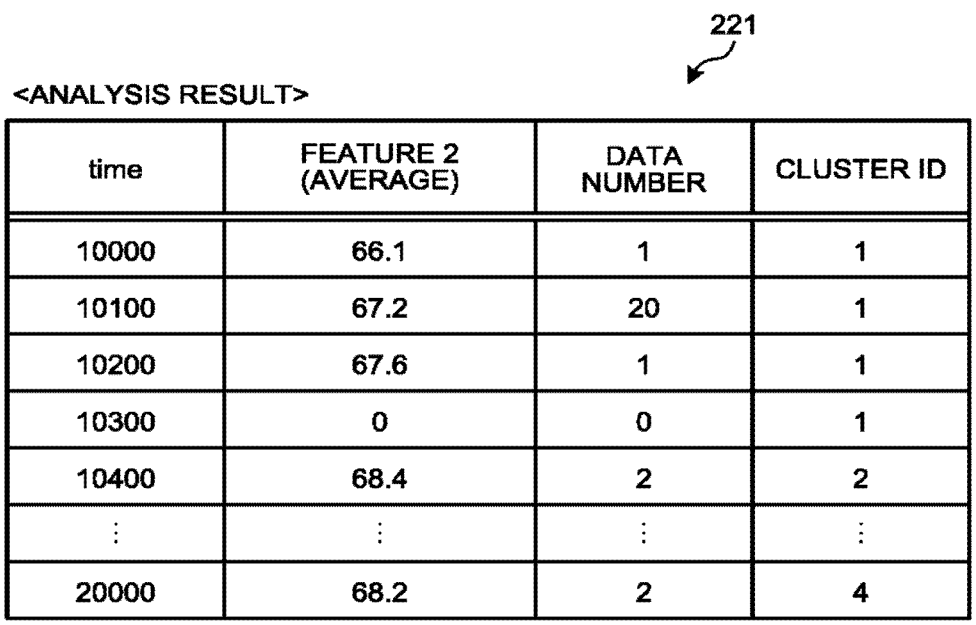
FIG. 26 is a diagram illustrating an example of the data structure of an analysis result in a second example of the second embodiment.
Figure 27:
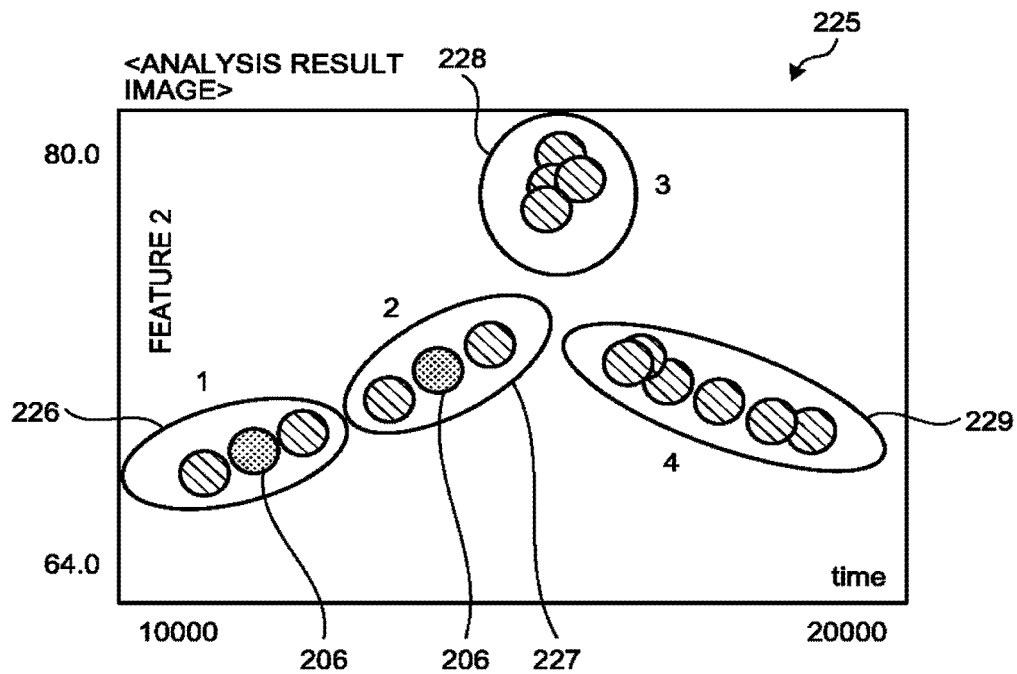
FIG. 27 is a diagram illustrating an example of an analysis result image in the second example of the second embodiment.

FIG. 26 is a diagram illustrating an example of the data structure of an analysis result 221 in a second example of the second embodiment. The analysis result 221 in this example is data providing by joining the "cluster ID" contained in the analysis result 211 illustrated in FIG. 24 to the aggregating data 201 illustrated in FIG. 22.

Figure 28:
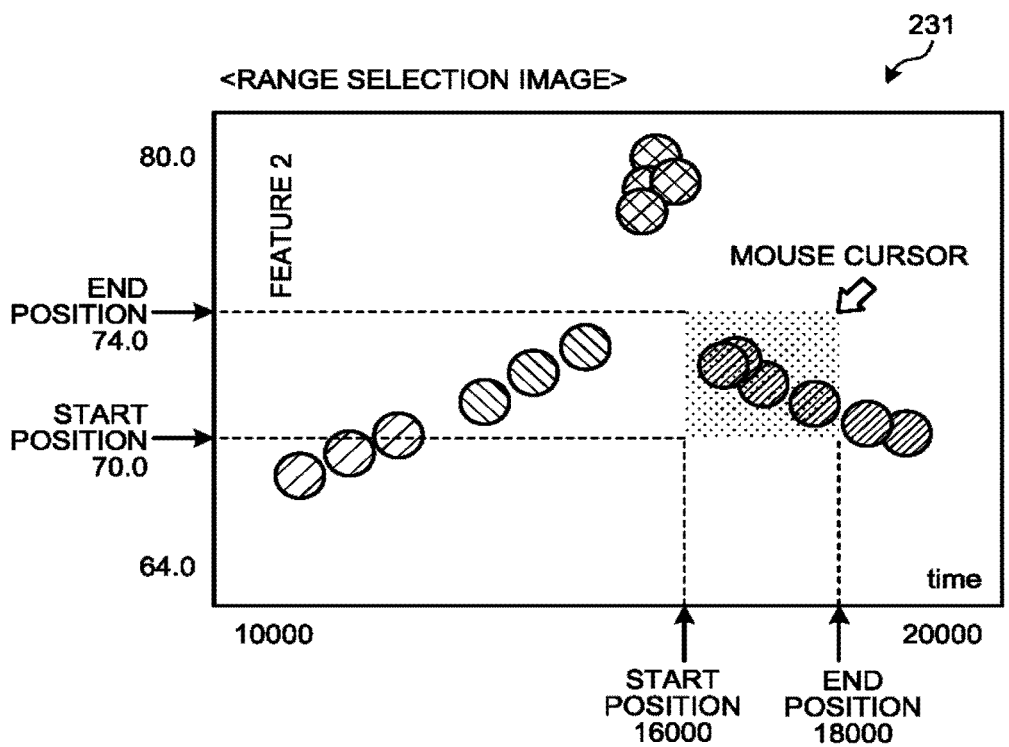
FIG. 28 is a diagram illustrating an example of a range selection image in the second example of the second embodiment.

FIG. 28 is a diagram illustrating an example of an analysis result image 225 in the second example of the second embodiment. The analysis result image 225 is an image provided by superimposing cluster objects 226 to 229 indicating the respective clusters on the data image 205 illustrated in FIG. 23. In this example, the first cluster object 226 surrounds dots configuring the cluster corresponding to the cluster ID "1", the second cluster object 227 surrounds dots configuring the cluster corresponding to the cluster ID "2", the third cluster object 228 surrounds dots configuring the cluster corresponding to the ter ID "3", and the fourth cluster object 229 surrounds dots configuring the cluster corresponding to the cluster ID "4".

FIG. 28 is a diagram illustrating an example of a range selection image 231 in the second example of the second embodiment. The range selection image 213 in this example is an example of a graphic user interface that is used when the range selection operation is performed and is configured so as to enable setting of a desired selected range from the attribute value range for the "time" on the X axis and the attribute value range for the "feature 2" on the Y axis using the mouse cursor on the analysis result image 215 illustrated in FIG. 25. In this example, a "start position of 16000" and an "end position of 18000" are set for the X axis and a "start position of 70" and an "end position of 74" are set for the Y axis.

FIG. 29 is a diagram illustrating an example of the data structure of selected range information 235 in the second embodiment. Although the selected range information 36 in the first embodiment illustrated in FIG. 6 is information indicating only the selected range (the start position and the end position) corresponding to the X axis (time), the selected range information 235 in this example is information indicating the selected range corresponding to the X axis (time) and the selected range corresponding to the Y axis (feature 2).

FIG. 30 is a diagram illustrating an example of the data structure of an analysis result 241 in a third example of the second embodiment. The analysis result. 241 in this example indicates a result of the clustering processing performed on the aggregating data 201 illustrated in FIG. 22 on the basis of the selected range information 235 illustrated in FIG. 29.

The above-mentioned clustering processing may be performed by using the above-mentioned "data number" as the weight. The analysis unit 103 in this example classifies pieces of data of the aggregating data 201 that correspond to the selected range indicated by the selected range information 235 into a cluster (in this example, a cluster ID "4") differing from other pieces of data.

Figures 31, 32:
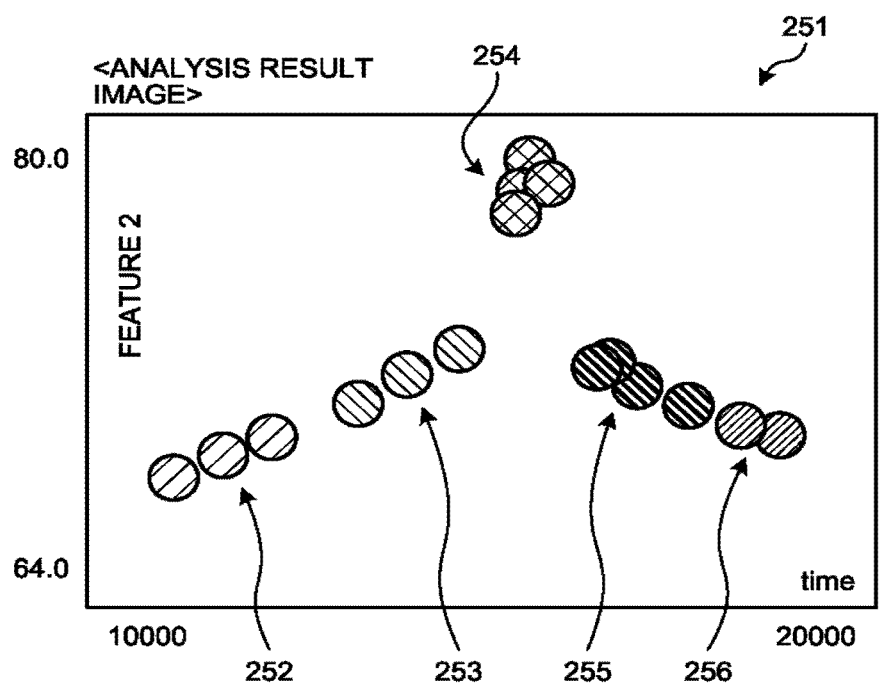
FIG. 31 is a diagram illustrating an example of the data structure of an analysis result in a fourth example of the second embodiment.
FIG. 32 is a diagram illustrating an example of an analysis result image in the third example of the second embodiment.

FIG. 31 is a diagram illustrating an example of the data structure of an analysis result 245 in a fourth example of the second embodiment. The analysis result 245 in this example is data provided by joining the "cluster ID" contained in the analysis result 241 illustrated in FIG. 30 to the aggregating data 201 illustrated in FIG. 22.

FIG. 32 is a diagram illustrating an example of an analysis result image 251 in the third example of the second embodiment. The analysis result image 251 in this example is an image provided by visualizing the analysis result 241 illustrated in FIG. 30 or the analysis result 245 illustrated in FIG. 31, and contains cluster objects 252 to 256 with different display formats for the respective clusters as in the analysis result image 215 illustrated in FIG. 25. In this example, a group of the first cluster object 252 corresponds to the cluster ID "1", a group of the second cluster object 253 corresponds to the cluster ID "2", a group of the third cluster object 254 corresponds to the cluster ID "3", a group of the fourth cluster object 255 corresponds to the cluster ID "4", and a group of the fifth cluster object 256 corresponds to the cluster ID "5".

As described above, according to the present embodiment, the number of pieces of data used for calculating the value aggregated by the aggregating processing is used for the analysis processing (weighting of the analysis result and so on). The reliability of the analysis result can thereby be improved. The analysis processing can be appropriately performed also on the primary data 151 configured only by the columns for which the attribute values are not aligned with equal intervals.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the systems, methods, and computer program products can be made without departing from the spirit of the inventions. The accompanying claims and their equivalents are intended to cover such forms or modifications as would fall within the scope and spirits of the inventions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data analysis system comprising:
   a memory; and
   one or more processors coupled to the memory, the one or more processors being configured to:
      provide a graphical interface configured to select a time column and a feature column from a plurality of columns contained in a first data set and an attribute value range to be extracted from a plurality of attribute values contained in the selected time column;

extract, from the first data set, a second data set corresponding to the selected time and feature columns and the attribute value range;

select a unit of aggregation for the extracted second data set, wherein a number of attribute values contained in the unit of aggregation is smaller than a number of attribute values contained in the attribute value range;

group attribute values contained in the second data set by the unit of aggregation to generate a plurality of groups for the second data set, wherein a number of the plurality of groups is smaller than the number of attribute values contained in the attribute value range;

perform, for each of the generated plurality of groups and based on a predetermined parameter related to a restriction on a resource of the system, an aggregation process on attribute values contained in a corresponding group to generate a third data set for the plurality of groups, wherein the third data set has a reduced data amount relative to the second data set;

store the reduced third data set in the memory;

analyze the third data set stored in the memory to generate an analysis result;

perform clustering processing on the reduced third data to generate a plurality of cluster objects each corresponding to a respective range of time in the third data set;

display a data image provided by visualizing the third data set and an analysis result image provided by visualizing the analysis result of the third data set, the data image displaying the cluster objects;

determine whether one or more of the cluster objects corresponds to a singular object; and display the singular object on the data image, the singular object corresponding to, among the plurality of groups, a group of which a first data number indicating a number of pieces of data used for performing the aggregation process is equal to or larger than a predetermined value, the singular object being displayed on the data image with a display format different from that of another cluster object, change the selected column or the attribute value range via the graphical interface; and update the data image and the analysis result image in a linked manner in accordance with the change to the selected column or the attribute value range, wherein the plurality of attribute values of the time column in the first data set are not aligned at equal intervals so that, among the plurality of groups, a number of attribute values contained in one group is different from a number of attribute values of another group of the plurality of groups.

2. The data analysis system according to claim 1, wherein the one or more processors are further configured to use a second data number indicating a number of pieces of data used for calculating a value for weighting of the analysis result.

3. The data analysis system according to claim 2, wherein the one or more processors are further configured to use the second data number for weighting of an analysis result of the clustering processing.

4. The data analysis system according to claim 1, wherein the one or more processors are further configured to display the data image and the analysis result image on one screen to superimpose the analysis result image on the data image.

5. The data analysis system according to claim 1, wherein performing the aggregation process comprises determining one of an average, a maximum and a minimum of the attribute values.

6. The data analysis system according to claim 1, wherein the one or more processors are further configured to display markings indicating different cluster objects.

7. The data analysis system according to claim 1, wherein the one or more processors are further configured to display cluster objects and the singular object with a uniform size.

8. The data analysis system according to claim 1, wherein the one or more processors are further configured to display cluster objects and the singular object such that the singular object has a display format different than that of the cluster objects and the cluster objects have display formats different from one another.

9. The data analysis system according to claim 1, wherein determining whether one or more of the cluster objects corresponds to a singular object comprises determining that a reliability of the aggregation process is higher.

10. The data analysis system according to claim 1, wherein performing clustering processing comprises grouping a selected number of third data to form a cluster.

11. The data analysis system according to claim 1, wherein:
the system further comprises a display; and
the restriction on a resource of the system comprises a limit on a resolution of the display.

12. The data analysis system according to claim 1, wherein the restriction on the system resource comprises one of a limit on a resolution of the display, a processing ability of the one of more processors and a storage capacity of the memory.

13. The data analysis system according to claim 1, wherein the one or more processors are configured to:
determine whether the aggregation process is necessary based upon the restriction on the resource of the system, output the second data set when it is determined that the aggregation process is not necessary, and perform the aggregation processing when is it determined that the aggregation process is necessary.

14. The data analysis system according to claim 13, wherein:
the system further comprises a display; and
the restriction on a resource of the system comprises one of a limit on a resolution of the display, a processing ability of the one of more processors and a storage capacity of the memory.

15. The data analysis system according to claim 1, wherein the one or more processors are further configured to:
update at least one of the second data set and third data set in accordance with the change of the selected column or the attribute value range and update the analysis result in accordance with the change of the selected column or the attribute value range in the linked manner while changing the selected column or attribute range via the graphical interface.

16. A data analysis method comprising:
selecting, by a graphical interface of a computer system, a time column and a feature column from a plurality of columns contained in a first data set and an attribute value range to be extracted from a plurality of attribute values contained in the selected time column;

extracting, by the computer system from the first data set, a second data set corresponding to the selected time and feature columns and the attribute value range;

selecting, by the computer system, a unit of aggregation for the extracted second data set, wherein a number of attribute values contained in the unit of aggregation is smaller than a number of attribute values contained in the attribute value range;

grouping, by the computer system, attribute values contained in the second data set by the unit of aggregation to generate a plurality of groups for the second data set, wherein a number of the plurality of groups is smaller than the number of attribute values contained in the attribute value range;

performing, by the computer system for each of the generated plurality of groups and based on a predetermined parameter related to a restriction on a resource of the system, an aggregation process on attribute values contained in a corresponding group to generate a third data set for the plurality of groups, wherein the third data set has a reduced data amount relative to the second data set;

storing, by the computer system, the reduced third data set in a memory;

analyzing, by the computer system, the third data set stored in the memory to generate an analysis result;

performing clustering processing, by the computer system, on the reduced third data to generate a plurality of cluster objects each corresponding to a respective range of time in the third data set;

displaying, by the computer system, a data image provided by visualizing the third data set and an analysis result image provided by visualizing the analysis result of the third data set, the data image displaying the cluster objects, determining, by the computer system, whether one or more of the cluster objects corresponds to a singular object, displaying, by the computer system, the singular object on the data image, the singular object corresponding to, among the plurality of groups, a group of which a data number indicating a number of pieces of data used for performing the aggregation process is equal to or larger than a predetermined value, the singular object being displayed on the data image with a display format different from that of another cluster object, changing the selected column or the attribute value range via the graphical interface; and updating the data image and the analysis result image in a linked manner in accordance with the change to the selected column or the attribute value range, wherein the plurality of attribute values of the time column in the first data set are not aligned at equal intervals so that, among the plurality of groups, a number of attribute values contained in one group is different from a number of attribute values of another group of the plurality of groups.

17. A computer program product having a non-transitory computer readable medium including programmed instructions, wherein the instructions, when executed by a computer, cause the computer to perform:

selecting, using a graphical interface, a time column and a feature column from a plurality of columns contained in a first data set and an attribute value range to be extracted from a plurality of attribute values contained in the selected time column;

extracting, from the first data set, a second data set corresponding to the selected time and feature columns and the attribute value range;

selecting a unit of aggregation for the extracted second data set, wherein a number of attribute values contained in the unit of aggregation is smaller than a number of attribute values contained in the attribute value range;

grouping attribute values contained in the second data set by the unit of aggregation to generate a plurality of groups for the second data set, wherein a number of the plurality of groups is smaller than the number of attribute values contained in the attribute value range;

performing, for each of the generated plurality of groups and based on a predetermined parameter related to a restriction on a system resource, an aggregation process on attribute values contained in a corresponding group to generate a third data set for the plurality of groups, wherein the third data set has a reduced data amount relative to the second data set;

storing the reduced third data set in a memory of the computer;

analyzing the third data set stored in the memory to generate an analysis result;

performing clustering processing on the reduced third data to generate a plurality of cluster objects each corresponding to a respective range of time in the third data set;

displaying a data image provided by visualizing the third data set and an analysis result image provided by visualizing the analysis result of the third data set, the data image displaying the cluster objects, determining whether one or more of the cluster objects corresponds to a singular object, displaying the singular object on the data image, the singular object corresponding to, among the plurality of groups, a group of which a data number indicating a number of pieces of data used for performing the aggregation process is equal to or larger than a predetermined value, the singular object being displayed on the data image with a display format different from that of another cluster object, changing the selected column or the attribute value range via the graphical interface, and updating the data image and the analysis result image in a linked manner in accordance with the change to the selected column or the attribute value range, wherein the plurality of attribute values of the time column in the first data set are not aligned at equal intervals so that, among the plurality of groups, a number of attribute values contained in one group is different from a number of attribute values of another group of the plurality of groups.

* * * * *